US012233951B2

(12) United States Patent
Richardson (10) Patent No.: US 12,233,951 B2
(45) Date of Patent: Feb. 25, 2025

(54) REINFORCEMENT STRUCTURE

(71) Applicant: Zephyros, Inc., Romeo, MI (US)

(72) Inventor: Henry E. Richardson, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 539 days.

(21) Appl. No.: 17/599,267

(22) PCT Filed: Mar. 12, 2020

(86) PCT No.: PCT/US2020/022235
§ 371 (c)(1),
(2) Date: Sep. 28, 2021

(87) PCT Pub. No.: WO2020/205192
PCT Pub. Date: Oct. 8, 2020

(65) Prior Publication Data
US 2022/0169317 A1      Jun. 2, 2022

Related U.S. Application Data

(60) Provisional application No. 62/827,926, filed on Apr. 2, 2019.

(51) Int. Cl.
*B62D 29/00*      (2006.01)
*B29C 45/14*      (2006.01)
(Continued)

(52) U.S. Cl.
CPC ............ *B62D 27/026* (2013.01); *B29C 45/14* (2013.01); *B29C 65/483* (2013.01);
(Continued)

(58) Field of Classification Search
CPC .. B62D 27/026; B62D 29/004; B62D 29/048; B62D 29/04; B62D 25/00; B29C 45/14;
(Continued)

(56) References Cited

U.S. PATENT DOCUMENTS 5,884,960 A    3/1999  Wycech
6,348,513 B1   2/2002  Hilborn et al.
(Continued)

FOREIGN PATENT DOCUMENTS

CN      104943748 A    9/2015
WO   2003/020574 A1    3/2003
(Continued)

OTHER PUBLICATIONS

International Search Report dated Jun. 24, 2020, PCT Application No. PCT/US20/022235.
(Continued)

*Primary Examiner* — Pinel E Romain
(74) *Attorney, Agent, or Firm* — The Dobrusin Law Firm, P.C.; Daniela M. Thompson-Walters (57) ABSTRACT

A structural member (10) comprising: (i) a first carrier (12A) and a second carrier (12B), each carrier including a plurality of interconnecting ribs (16), each carrier further including one or more projections (28) extending from exterior walls (30) of each carrier; (ii) one or more secondary members (14) secured to one or more surfaces of each carrier; and (iii) an adhesive material (32) disposed on the first carrier (12A), the second carrier (12B), or both, wherein the first carrier (12A) and the second carrier (12B) are bonded to each other via the adhesive material (32).

18 Claims, 9 Drawing Sheets

(51) Int. Cl.
- *B29C 65/00* (2006.01)
- *B29C 65/48* (2006.01)
- *B29C 65/78* (2006.01)
- *B29C 70/52* (2006.01)
- *B62D 27/02* (2006.01)
- *B62D 29/04* (2006.01)

(52) U.S. Cl.
CPC ...... *B29C 65/7855* (2013.01); *B29C 66/1312* (2013.01); *B29C 66/21* (2013.01); *B29C 66/54* (2013.01); *B29C 66/712* (2013.01); *B29C 66/7212* (2013.01); *B29C 66/7252* (2013.01); *B29C 70/52* (2013.01); *B62D 29/004* (2013.01); *B62D 29/048* (2013.01)

(58) Field of Classification Search
CPC ............. B29C 65/483; B29C 65/7855; B29C 66/1312; B29C 66/21; B29C 66/54; B29C 66/712; B29C 66/7212; B29C 66/7252; B29C 70/52; B29C 66/71
USPC .................................................... 296/187.02
See application file for complete search history.

(56) References Cited

U.S. PATENT DOCUMENTS

| | | | |
|---|---|---|---|
| 6,368,438 B1 | 4/2002 | Chang | |
| 6,467,834 B1 | 10/2002 | Barz | |
| 6,811,864 B2 | 11/2004 | Czaplicki et al. | |
| 6,890,021 B2 | 5/2005 | Bock | |
| 6,920,693 B2 | 7/2005 | Hankins | |
| 6,921,130 B2 | 7/2005 | Barz | |
| 6,932,421 B2 | 8/2005 | Barz | |
| 7,114,763 B2 * | 10/2006 | Riley | B62D 29/002 296/187.03 |
| 7,125,461 B2 | 10/2006 | Czaplicki et al. | |
| 7,249,415 B2 | 7/2007 | Larsen et al. | |
| 7,838,100 B2 * | 11/2010 | McLeod | B62D 29/002 296/187.02 |
| 8,047,603 B2 * | 11/2011 | Goral | B62D 29/001 296/193.06 |
| 8,361,589 B2 * | 1/2013 | Kraushaar | B62D 29/002 428/317.1 |
| 8,430,448 B2 * | 4/2013 | Richardson | B29C 65/4855 296/187.02 |
| 9,815,498 B2 * | 11/2017 | Yamamoto | B62D 29/002 |
| 9,975,578 B2 * | 5/2018 | Akhlaque-E-Rasul | B62D 21/157 |
| 10,570,258 B2 | 2/2020 | Richardson et al. | |
| 10,718,086 B2 * | 7/2020 | Braymand | B29C 45/1671 |
| 11,110,670 B2 | 9/2021 | Richardson et al. | |
| 11,691,580 B2 * | 7/2023 | Riva | F16F 7/12 293/133 |
| 2003/0042056 A1 | 3/2003 | Scheider et al. | |
| 2003/0057737 A1 | 3/2003 | Bock | |
| 2004/0076831 A1 | 4/2004 | Hable et al. | |
| 2007/0051465 A1 * | 3/2007 | Naughton | B29C 66/7212 156/305 |
| 2008/0202674 A1 * | 8/2008 | Schneider | B62D 29/002 428/542.8 |
| 2013/0049406 A1 | 2/2013 | Hasl | |
| 2015/0129116 A1 | 5/2015 | Richeton et al. | |
| 2017/0173860 A1 * | 6/2017 | Grgac | B29C 66/131 |
| 2018/0036970 A1 | 2/2018 | Chmielewski et al. | |
| 2020/0157293 A1 | 5/2020 | Chmielewski et al. | |
| 2021/0053625 A1 | 2/2021 | Richardson | |
| 2021/0237377 A1 | 8/2021 | Richardson | |
| 2022/0080912 A1 | 3/2022 | Barz | |
| 2022/0097776 A1 | 3/2022 | Royston | |

FOREIGN PATENT DOCUMENTS

| | | |
|---|---|---|
| WO | 2019/241598 A1 | 3/2003 |
| WO | 2015/179383 A1 | 11/2015 |
| WO | 2020/198139 A1 | 10/2020 |
| WO | 2020/214769 A1 | 10/2020 |
| WO | 2021/080917 A1 | 4/2021 |

OTHER PUBLICATIONS

Chinese Office Action and Search Report dated Feb. 15, 2023, Application No. 202080027131.2.

* cited by examiner

FIG. 9

REINFORCEMENT STRUCTURE

FIELD

The present invention generally relates to structural members, and more particularly to hybrid material structural members for use in providing reinforcement and support to sections of one or more structures.

BACKGROUND

Transportation vehicles frequently utilize structural members to form, support, reinforce, or a combination thereof certain vehicle structures. Unfortunately, such members tend to be formed of relatively heavy materials, adding undesirable weight to the vehicle. For some applications, it has become popular in recent years to employ a polymeric carrier structure in combination with a secondary material, such as an expandable adhesive material as part of the reinforcement. However, even these materials may add significant weight and can be costly and time consuming to manufacture. Moreover, the materials used to form the structural members may be configured to increase structural stiff of the structural member or increase energy absorption of the structural member. However, the structural member may as a result be too stiff for sufficient energy absorption, too flexible for sufficient structural stiffness, or both. Additionally, it may be difficult to provide sufficient structural support to certain vehicle structures using more lightweight materials, thereby increasing the risk of damage or breakage of the structural members, the vehicle structures being support by the structural members, or both.

Examples of structural members can be found in U.S. Pat. Nos. 6,932,421; 6,921,130; 6,920,693; 6,890,021; and 6,467,834, all of which are incorporated by reference herein for all purposes. Thus, there remains a need for structural reinforcements that include more lightweight materials while maintaining the necessary strength to support one or more vehicle structures or vehicle components. What is needed is a lightweight structural member that includes one or more strengthening features. There remains a need for structural members that may provide increased customization and tunability based on a desired application. What is needed is a structural member that may be configured to attach to a vehicle structure, one or more vehicle components, or both using a plurality of attachment features. There remains a need for a structural member that is cost-effective and easy to manufacture. What is needed is a structural member formed using a combination of time-efficient manufacturing techniques. There remains a need for a structural member that may be secured to a vehicle structure, vehicle component, or both free of an increase in temperature. What is needed is a structural member having one or more adhesives that cure at room temperature.

SUMMARY

The present teachings meet one or more of the above needs by the improved devices and methods described herein.

The present teachings meet one or more of the present needs by providing a structural member comprising: (i) a first carrier and a second carrier, each carrier including a plurality of interconnecting ribs, each carrier further including one or more projections extending from exterior walls of each carrier; (ii) one or more secondary members secured to one or more surfaces of each carrier; and (iii) an adhesive material disposed on the first carrier, the second carrier, or both, wherein the first carrier and the second carrier are bonded to each other via the adhesive material.

The present teachings meet one or more of the present needs by providing a structural member, wherein: the adhesive material is cured at room temperature to bond the first carrier and the second carrier; the carriers and the one or more secondary members are different materials; the carriers are a polyamide material and the one or more secondary members are a carbon fiber reinforced thermoplastic; the adhesive material is disposed on the one or more projections and the one or more projections of the first carrier and the second carrier abut one another to form the bond; one or more mechanical fasteners temporarily connect the first carrier and the second carrier together during a curing time of the adhesive material; one or more through holes of the first carrier and one or more through holes of the second carrier are aligned so that the mechanical fasteners extend through the aligned one or more through holes, and after curing of the adhesive material to bond the first carrier and the second carrier, the one or more through holes of the first carrier and the one or more through holes of the second carrier are configured to mount the structural member to one or more structures of a vehicle; after bonding, the first carrier and the second carrier form a clamshell shape and the one or more secondary members are positioned within the clamshell shape; the first carrier and the second carrier are overmolded around one or more surfaces of the one or more secondary members; the curing time of the adhesive material is unaffected by heating the adhesive material to a temperature of about 204° C. or less; the plurality of interconnecting ribs form one or more cavities within the first carrier, the second carrier, or both; the one or more cavities include a cutout near the one or more surfaces of the first carrier, the second carrier, or both that abuts the one or more secondary members; the one or more through holes of the first carrier and the one or more through holes of the second carrier include a reinforcement member; one or more monolithically formed fasteners project from the one or more projections; the one or more monolithically formed fasteners are a push pin type fastener; the one or more secondary members extend along one or more outer walls of the first carrier, the second carrier, or both; the first carrier and the second carrier are extruded or pultruded nylon material and the one or more secondary members are a molded carbon fiber reinforced thermoplastic; the carbon fiber reinforced thermoplastic includes an epoxy resin, and the epoxy resin bonds to the extruded nylon material so that the first carrier and the second carrier are bonded to the one or more secondary members; the first carrier and the second carrier form a cavity configured to receive one or more components configured to be reinforced; the first carrier and the second carrier increase stiffness of the structural member and the one or more secondary members increase impact absorption of the structural member; or a combination thereof.

The present teachings meet one or more of the present needs by providing: structural reinforcements that include more lightweight materials while maintaining the necessary strength to support one or more vehicle structures or vehicle components; a lightweight structural member that includes one or more strengthening features; structural members that may provide increased customization and tunability based on a desired application; a structural member that may be configured to attach to a vehicle structure, one or more vehicle components, or both using a plurality of attachment features; a structural member that is cost-effective and easy to manufacture; a structural member formed using a combination of time-efficient manufacturing techniques; a structural member that may be secured to a vehicle structure, vehicle component, or both free of an increase in temperature; a structural member having one or more adhesives that cure at room temperature; or a combination thereof.

DETAILED DESCRIPTION

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein are directed toward a structural member. The structural member may function to provide structural integrity to a vehicle. The structural member may function to support one or more vehicle structures, vehicle components, or both. The structural member may function to connect one or more vehicle structures, vehicle components, or both. The structural member may be configured for integration into any vehicle, such as an automobile, truck, airplane, boat, train, or a combination thereof. The structural member may be configured for any industry requiring structural reinforcement, such as automotive, aeronautical, aerospace, residential and/or commercial real estate construction, transportation, or a combination thereof. For example, the structural member may be positioned in an automobile to support one or more structures and/or components of the vehicle, such as a steering column, transmission, engine block, instrument panel, console, or a combination thereof. Alternatively, or additionally, the structural member may reinforce a body of an automobile.

The structural member may provide increased structural integrity to one or more components, one or more structures, or both. The structural member may increase structural integrity during an impact of the one or more components, one or more structures, or both. The structural member may increase energy absorption from a direct impact, and indirect impact, or both. The structural member may increase stiffness, hardness, or both. The structural member may use one or more materials to provide different material properties. For example, the structural member may use a first material to increase impact absorption and use a second material to increase stiffness.

The structural member may include a carrier and a secondary member connected or secured to the carrier. The structural member may include one or more mounting features. The structural member may include one or more cavities, one or more through holes, one or more projections, one or more tabs, one or more reinforcement structures, one or more cavities, one or more cutouts, one or more walls, or a combination thereof. The structural member may be uniformly manufactured (i.e., integrally formed) or may include a plurality of components secured together. The structural member may be formed of substantially a single material or may be formed of a plurality of materials. For example, the carrier of the structural member may be a first material while the secondary member may be a second material.

The structural member may be manufactured using a variety of techniques. The structural member may be molded (e.g., injection molded), stamped, extruded, pultruded, cast, cut, or a combination thereof. The structural member may be manufactured using a single technique or a combination of techniques. For example, the carrier of the structural member may be molded while the secondary member may be pultruded or extruded. More specifically, the structural member may include a pultruded secondary member having a carrier overmolded around the secondary member, forming a hybrid structural member.

The structural member may include a carrier. The carrier may function to provide structural support to a vehicle structure, one or more vehicle components, or both. The carrier may function to support a secondary member. The carrier may be configured to attach to one or more components of a vehicle, a structure of a vehicle, or both. For example, the carrier may be secured to a transmission of the vehicle and also attach to one or more rails of the vehicle body. The carrier may be configured to attach to one or more additional carriers. For example, a first carrier and a second carrier may be secured to one another to form the structural member. The first carrier and the second carrier may have complimentary shapes so that, when secured to another, form an overall desired shape. For example, the first carrier and the second carrier may have a substantially "U"-shaped structure so that, when secured to one another, the first carrier and the second carrier may form a clamshell structural member.

The carrier may include one or more faces, one or more surfaces, one or more walls, reinforcing structures, or a combination thereof. The carrier may include one or more arcuate portions, one or more linear portions, or both. The carrier may include one or more projections. The carrier may include one or more contoured surfaces, one or more flat surfaces, or both. The carrier may include one or more cutouts. The carrier may include one or more cavities, one or more through holes, or both. The carrier may include one or more fasteners. The carrier may include one or more arms, one or more fingers, one or more legs, or a combination thereof. The carrier may include one or more steps, one or more ledges, one or more flanges, one or more tabs, one or more gussets, one or more channels, or a combination thereof. The carrier may be any desired size and shape based on a desired application. For example, the carrier may structurally support a transmission of a vehicle, and the carrier may be substantially shaped to receive a portion of the transmission, substantially shaped to connect to the transmission, or both.

The carrier may be formed of a single integral piece. For example, the carrier may be a uniform injection-molded part. Alternatively, the carrier may comprise a plurality of subcomponents that form the carrier. For example, the carrier may include a first carrier component that is secured to a second carrier component via one or more adhesives, one or more fasteners, or a combination thereof.

The carrier may be structurally rigid. The carrier may be flexible. The carrier may have one or more localized flexible joints that allow flexing of the carrier only at desired locations. The carrier may be compressible. The carrier may be elastic so that, upon flexing, the carrier may return to an original position free of inelastic deformation. The carrier may be structurally rigid to support a desired load. For example, the carrier may support about 25 kilograms or more, about 50 kilograms or more, or about 75 kilograms or more. The carrier may support about 175 kilograms or less, about 150 kilograms or less, or about 125 kilograms or less.

The carrier may be formed of a moldable material. The carrier may be an extruded material. The carrier may be a pultruded material. The carrier may be an injection-molded material. The carrier may be a polymeric material, a polyamide material, or both. The polymeric material may be a reinforced polymeric material. For example, the polymeric material may be a glass fiber reinforced polyamide. The polymeric material may be a thermoset material. The polymeric material may be a thermoplastic material. The polymeric material may be a thermoplastic epoxy material. The polymeric material may be a fiber reinforced thermoplastic epoxy material. The carrier may be any material that may provide structural reinforcement to a vehicle structure, one or more vehicle components, or both.

The carrier may include one or more abrasive surfaces. For example, the carrier may include one or more abrasions, one or more bumps, one or more ridges, or a combination thereof. The carrier may include one or more friction modifiers, such as grease, oil, silicone, other lubricant, or a combination thereof. The carrier may be free of one or more abrasive surfaces, one or more friction modifiers, or both.

The carrier may be formed from one or more walls. The walls may function to establish a shape of the carrier and support one or more components of a vehicle, a structure of the vehicle, or both. The walls may define an outer dimension of the carrier. The walls may interconnect to form a shape of the carrier. For example, peripheral edges of the walls may connect to one another to form a substantially outer perimeter of the carrier. The walls may be an exterior surface of the carrier. The walls may vary in size and shape. The walls may have a uniform thickness. The walls may have one or more arcuate portions, one or more linear segments, or both. The walls may be integrally formed (i.e., formed as a single piece free of secondary adhesives or fasteners that connect the walls). The walls may at least partially enclose one or more ribs of the carrier.

The carrier may include one or more ribs. The ribs may function to increase structural support of the carrier. The ribs may function to support one or more secondary members. The ribs may deflect, displace, or both one or more secondary members upon expansion of the one or more secondary members, activation of the secondary members, or both. The ribs may be dispersed throughout the carrier to provide increased structural integrity in one or more desired locations. The ribs may be a gusset, flange, or both.

The ribs may be interconnected. The ribs may extend between one or more walls of the carrier. The ribs may vary in size and shape. The ribs may include one or more arcuate portions, one or more linear segments, or both. The ribs may be at least partially housed between walls of the carrier. The ribs may abut one or more surfaces of the carrier. The ribs may be interconnected at any desired position, angle, or both.

The ribs, the walls, or both may interconnect to form one or more cavities of the carrier. The cavities may function to house a secondary member. The cavities may extend through a thickness of the carrier. The cavities may extend through an entire thickness of the carrier, a partial thickness of the carrier, or both. The cavities may vary in size and shape and may be any size and shape that houses a secondary member. The cavities may be formed from about two or more, about three or more, or about four or more ribs, walls, or both. The cavities may be formed from about seven or less, about six or less, or about five or less ribs, walls, or both. The cavities may be formed by one or more carriers. For example, a first carrier and a second carrier may form a clamshell shape having a cavity formed between the first and second carrier. The cavity may receive one or more structural components, vehicle components, additional structural member components, or a combination thereof. A plurality of cavities may be located along the carrier, the secondary member, or both.

The one or more cavities may have a cutout located near one or more terminal ends. The cutout may function to expose the secondary member of the structural member. The cutout may function to direct expansion of the secondary member upon activation. The cutout may be a size and shape similar to the cavity. The cutout may have an opening greater or smaller than an opening of the cavity. The cutout may be located one or more exterior surfaces of the carrier. The cutout may be located anywhere along the carrier. The carrier may include a plurality of cutouts. The cutouts may be a uniform size and shape or may vary in size and shape.

The structural member may include one or more projections. The projection may function to abut one or more vehicle components, a vehicle structure, or both so that the structural member may be secured to the one or more vehicle components, a vehicle structure, or both. The projections may be configured to mate with one or more additional projections. For example, the a first set of projections on a first carrier may mate with a second set of projections on a second carrier to form the structural member. The projection may function to increase structural integrity of the structural member. The projection may project from any surface of the carrier, secondary member, or both. The projection may extend at an angle relative to one or more surfaces of the carrier, secondary member, or both. The projection may extend at an angle of about 30 degrees or more, about 45 degrees or more, or about 60 degrees or more. The projection may extend at an angle of about 120 degrees or less, about 105 degrees, or less or about 90 degrees or less. The projection may in the shape of a tab, post, extension, gusset, step, column, other projection, or a combination thereof.

The structural member may include a plurality of projections. The projections may vary in size and shape. The projections may be positioned anywhere along the carrier, the secondary member, or both. The projections may include one or more arcuate portions, one or more linear segments, or both. The projections may extend from a peripheral edge of the structural member. The projections may extend from one or more surfaces, one or more walls, or both of the structural member. The projections may be integrally (e.g., monolithically) formed with the carrier, the secondary member, or both.

The projections may be structurally rigid or may be flexible. For example, the projections may be flexible so that the projections deflect upon compression of the structural member and take a load upon compression.

One or more through holes may be located along the carrier. The through holes may function to receive one or more fasteners to secure the structural member to one or more vehicle components, a vehicle structure, one or more additional structural member components (e.g., an additional carrier), or a combination thereof. For example, one or more bolts may be threaded through the through holes so that the carrier may be fastened to a transmission of a vehicle. The through holes may extend between opposing surfaces of the carrier (i.e., extend through an entire thickness of the carrier). The through holes may extend through a thickness of the carrier less than an entire thickness. The through holes may be positioned anywhere along the carrier. The through holes may be located at an interconnection spot between a plurality of ribs, a plurality of walls, or a combination thereof. The through holes may be positioned along an exterior surface of the carrier. The through holes may bore a channel into and/or through the carrier. The through holes may bore a channel at an angle relative to a surface of the carrier. The channel may form an angle with a surface of the carrier of about 30 degrees or more, about 60 degrees or more, or about 90 degrees or more. The channel may form an angle with a surface of the carrier of about 175 degrees or less, about 120 degrees or less, or about 100 degrees or less.

The through holes may include a lubricant to aid with insertion of one or more fasteners. The lubricant may be grease, oil, silicon, another lubricant, or a combination thereof.

The through holes may be positioned within a vehicle to abut one or more associated holes of the vehicle. For example, a bolt may extend through a through hole of the carrier so that the bolt may be inserted into a hole of the vehicle, thereby securing the carrier to the vehicle. A first carrier of the structural member may include a first set of through holes that mate with a second set of through holes on a second carrier. When the first set of through holes is aligned with the second set of through holes, one or more fasteners may extend through the first and second carrier to temporarily or permanently secure the first and second carrier together.

The through holes may include a reinforcement member. The reinforcement member may function to increase structural integrity of the through holes. The reinforcement member be a different material than the carrier so that the reinforcement member may provide additional support for one or more components of a vehicle, a structure of a vehicle, or both. The reinforcement member may prevent compression of the carrier near the through holes. The reinforcement member may function in size and shape.

The reinforcement member may be a sleeve inserted into and extending through the through hole. The reinforcement member may be positioned near one or more openings of the through hole, or may reinforce substantially an entire through hole. Each through hole may have a reinforcement member. Only a portion of the through holes may have a reinforcement member. Alternatively, a through hole may have a plurality of reinforcement members. For example, a through hole may have a first reinforcement member near a first opening and a second reinforcement member near an opposing second opening.

The reinforcement member may be any material that provides additional structural integrity to the through holes. The reinforcement member may be a polymer, metal, or both. The metal may be steel, iron, copper, tin, aluminum, or a combination thereof. The reinforcement member may be stamped, cast, cut, or a combination thereof. The reinforcement member may include one or more corrosion prevention coatings, such as an electrophoretic paint, galvanic plating, or both.

The structural member may include one or more fasteners. The fasteners may function to secure the structural member to one or more components of a vehicle, a vehicle structure, or both. The fasteners may function to secure a first carrier and a second carrier of the structural member together. The fasteners may be integrally formed with the carrier, a secondary member, or both. The fasteners may be secured to the structural member. The fasteners may be a clip, bolt, screw, pin, lock, hook, the like, or a combination thereof. The fasteners may be positioned anywhere along the structural member. The fasteners may form a permanent connection to one or more portions of a vehicle or vehicle component. Permanent may be defined as a connection that may only be broken by inelastic deformation or damage to the structural member and/or fastener. The fasteners may removably engage the structural member to one or more portions of a vehicle or vehicle component. The fasteners may be temporary fasteners. For example, a first and second carrier may be secured together using one or more temporary fasteners until an adhesive bond between the first and second carrier is cured. Once the adhesive bond is cured, the one or more temporary fasteners may be removed.

The structural member may include a secondary member. The secondary member may function to provide structural integrity to the structural member, the vehicle structure, one or more vehicle components, or a combination thereof. The secondary member may function to secure, connect, or both the structural member to the vehicle structure, one or more vehicle components, or a combination thereof.

The secondary member may have a size and shape similar to the carrier. The secondary member may have a size and shape that differs from the carrier. The secondary member may have one or more surfaces, one or more walls, one or more cavities, one or more through holes, one or more reinforcement structures, one or more faces, or a combination thereof. The secondary member may have one or more contoured surfaces, one or more undulations, one or more curves, one or more arcuate portions, one or more linear portions, or a combination thereof. The secondary member may be substantially flat. For example, the secondary member may be formed into a sheet having a desired thickness. The thickness of the secondary member may be about 1 mm or more, about 2 mm or more, or about 3 mm or more. The thickness of the secondary member may be about 6 mm or less, about 5 mm or less, or about 4 mm or less. The thickness of the secondary member may be uniform throughout substantially the entire secondary member (e.g., a sheet). Alternatively, the thickness of the secondary member may vary throughout the secondary member. For example, a first portion of the secondary member may have a thickness greater than a second portion of the secondary member, or vice versa.

The secondary member may be manufactured using one or more techniques. For example, the secondary member may be pultruded. The pultrusion may be continuous or may be cut to desired dimensions. Alternatively, the secondary member may be molded, extruded, or both. The secondary member may be formed of a polyurethane material. The secondary member may be formed of a thermoplastic material. For example, the secondary member may be a carbon fiber reinforced thermoplastic material. The secondary member may be formed of a thermoplastic epoxy material, or may include a thermoplastic epoxy material. For example, the secondary member may be formed substantially of a carbon fiber reinforced thermoplastic and may include an epoxy material. The epoxy material may form a bond with the carrier so that the connection between the carrier and the secondary member is free of any secondary fasteners. The structural member may be heat activated.

The secondary member may be secured and/or attached to the carrier. The secondary member may be disposed on one or more surfaces of the carrier. The secondary member may be inserted into one or more cavities of the carrier. The secondary member may be encapsulated by the carrier. For example, the carrier may be overmolded around the secondary member to at least partially encapsulate the secondary member. The carrier may include one or more cutouts that exposes the secondary member and allows protrusion of the secondary member outside of the carrier. The overmolded carrier may encapsulate one or more sides, one or more surfaces, or both of the secondary member. The carrier may form a cavity in which the secondary member is located. The carrier may abut one or more surfaces of the secondary member. An inner cavity of the carrier may substantially follow an exterior surface of the secondary member so that, once overmolded, the carrier substantially abuts an exterior of the secondary member.

The overmolding of the carrier around the secondary member may occur during manufacturing of the secondary member, after forming the secondary member, or both. For example, the secondary member may initially be pultruded, and the carrier may be overmolded around the pultruded secondary member. Alternatively, the secondary member may be molded first and the carrier may be overmolded around the secondary member.

The secondary member may be expandable. The secondary member may include an adhesive material and/or sealant material which may be a material that experiences expansion and/or cure upon exposures to temperatures of between about 148.89° C. to about 204.44° C. (about 300° F. to about 400° F.) (i.e., temperatures typically experienced in automotive painting or coating operations). The adhesive material and/or sealant material may be foamed (e.g., expanded) to a volume of at least about 5% greater, at least about 50% greater, at least about 200% greater, at least about 1000% greater, at least about 2000% greater, at least about 5000% greater, or higher relative to the original unexpanded volume.

The adhesive and/or sealant material may be an epoxy-based material such as those disclosed in U.S. Pat. Nos. 5,884,960; 6,348,513; 6,368,438; 6,811,864; 7,125,461; 7,249,415; and U.S. Patent Publication No. 2004/0076831, all of which are incorporated by reference herein for all purposes.

The adhesive materials and sealant materials may include an epoxy resin component. Epoxy resin is used herein to mean any of the conventional epoxy materials containing at least one epoxy functional group. The epoxy resins may be difunctional, trifunctional, multifunctional, combinations thereof or otherwise. Moreover, the term epoxy resin can be used to denote one epoxy resin or a combination of epoxy resins. The polymer-based materials may be epoxy-containing materials having one or more oxirane rings polymerizable by a ring opening reaction. The adhesive and/or sealant material may include between about 2% and 70% by weight epoxy resin, between about 7% and 50% by weight epoxy resin, between about 15% and 40% by weight epoxy resin, or between about 15% and about 25% by weight epoxy resin.

The epoxy may be aliphatic, cycloaliphatic, or aromatic. The epoxy may be supplied as a solid (e.g., as pellets, chunks, pieces or the like) or a liquid (e.g., an epoxy resin) or both. As used herein, a resin is considered to be a solid resin if it is solid at a temperature of 23° C. and is considered to be a liquid resin if it a liquid at 23° C. The presence of the epoxy resin increases the adhesion, flow properties, or both of the adhesive and/or sealant. One exemplary epoxy resin may be a phenolic resin, which may be a novalac type or other type resin. For example, bisphenol A resin, bisphenol F resin, a combination thereof or the like may be employed. Moreover, various mixtures of several different epoxy resins may be employed. Examples of suitable epoxy resins are sold under the tradename DER® (e.g., DER 331, DER 661, DER 662), commercially available from the Dow Chemical Company, Midland, Mich.

Liquid epoxy resins may be utilized. Such resins may be utilized to reduce the overall viscosity of the adhesive or sealant. Liquid epoxy resins that may be used typically may have a viscosity at a temperature of 23° C. of at least about 5000 cps, at least about 8000 cps, or at least about 11,000 cps, but may be less than about 30,000 cps, less than about 22,000 cps, or less than about 15,000 cps, although higher and lower values may also be possible unless otherwise stated. The liquid epoxy resin may have an epoxy equivalent weight of at least about 80 g/eq, at least about 150 g/eq, or at least about 185 g/eq, but may be less than about 300 g/eq, less than about 220 g/eq, or less than about 195 g/eq, although higher and lower values may also be possible unless otherwise stated. The liquid epoxy resin may include diglycidyl ethers that may be aromatic phenol based (bisphenol A or F) and are sold under the tradename DER 331, commercially available from the Dow Chemical Company and EPON 828 and EPON 863, commercially available from Hexion Specialty Chemicals.

The epoxy resins used herein are such that the formulated adhesive and sealant may be dry to the touch at ambient temperature.

Several additional polymers may be incorporated into the adhesive and/or sealant material, e.g., by copolymerization, by blending, or otherwise. For example, without limitation, other polymers that might be appropriately incorporated into the sealant material include halogenated polymers, polycarbonates, polyketones, urethanes, polyesters, silanes, sulfones, allyls, olefins, styrenes, acetates, ethylene vinyl acetates, acrylates, methacrylates, epoxies, silicones, phenolics, rubbers, polyphenylene oxides, terphthalates, or mixtures thereof. Other potential polymeric materials may be or may include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, and polyacetals.

The adhesive and/or sealant material may also include one or more materials for controlling the rheological characteristics of the sealant material over a range of temperatures (e.g., up to about 250° C. or greater). Any suitable art-disclosed rheology modifier may be used, and thus the rheology modifier may be organic or inorganic, liquid or solid, or otherwise. The rheology modifier may be a polymer, and more preferably one based upon an olefinic (e.g., an ethylene, a butylenes, a propylene or the like), a styrenic (e.g., a styrene-butadiene-containing rubber), an acrylic or an unsaturated carboxylic acid or its ester (such as acrylates, methacrylates or mixtures thereof; e.g., ethylene methyl acrylate (EMA) polymer) or acetates (e.g., EVA). The rheology modifier may be provided in a generally homogeneous state or suitable compounded with other ingredients. It is also contemplated that the various clays, minerals or other materials discussed in relation to fillers below may be employed to modify rheology of the adhesive and/or sealant material.

The adhesive and/or sealant material may each include one or more curing agents that assist the adhesive and/or sealant material in curing by crosslinking of the polymers, epoxy resins, and other ingredients in the material. The amount of curing agents or curing agent accelerators present in the adhesive and/or sealant material may range from about 0.001% by weight to about 9% by weight, from about 0.2 to about 6 wt %, or from about 2 wt % to about 6% by weight. The curing agent materials may be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, diamino diphenyl solfone, anhydrides, mercaptans, imidazoles, ureas, tertiary amines, BF3 complexes or mixtures thereof. The curing agents may include modified and unmodified polyamines or polyamides such as triethylenetetramine, diethylenetriamine tetraethylenepentamine, cyanoguanidine, dicyandiamides, and the like.

An accelerator for the curing agents (e.g., a modified or unmodified urea such as methylene diphenyl bis urea, an imidazole, blocked amine or a combination thereof) may also be provided for preparing the adhesive and/or sealant material.

The adhesive and/or sealant materials may contain other additives such as flexibilizers, impact modifiers, polymers or copolymers fillers and other elongation promoting additives.

An adhesive may be positioned on one or more surfaces of the structural member. The adhesive may function to secure a plurality of carriers, a plurality of secondary members, or both to one another. For example, the adhesive may function to secure a first carrier to a second carrier to form the structural member. The adhesive may be disposed on one or more outer surfaces of the carrier, the secondary member, or both. The adhesive may be located on the ribs, projections, walls, or a combination thereof the structural member. The adhesive may be positioned on a mating portion of the one or more carriers, one or more secondary members, or both. For example, a first carrier may include an adhesive located on one or more projections that mate with one or more projections of a second carrier. Alternatively, the first carrier and the second carrier may both include an adhesive material to bond the first carrier and second carrier together.

The adhesive may be curable. The adhesive may be cured at a heightened temperature during a manufacturing process, such as a paint baking process of a vehicle. Alternatively, the adhesive may be cured at room temperature and not require a heightened temperature to cure. For example, the adhesive may be cured at room temperature after a baking process of a vehicle and be unaffected by a temperature of the baking process (e.g., the adhesive is unaffected by a temperature of about 205 degrees or less). The adhesive may have a desired curing time. The curing time may be about 30 seconds or more, about 1 minute or more, or about 5 minutes or more. The curing time may be about 10 minutes or less, about 8 minutes or less, or about 6 minutes or less. One or more temporary fasteners may secure one or more components together (e.g., one or more carriers) until the adhesive cures.

Figure 1:
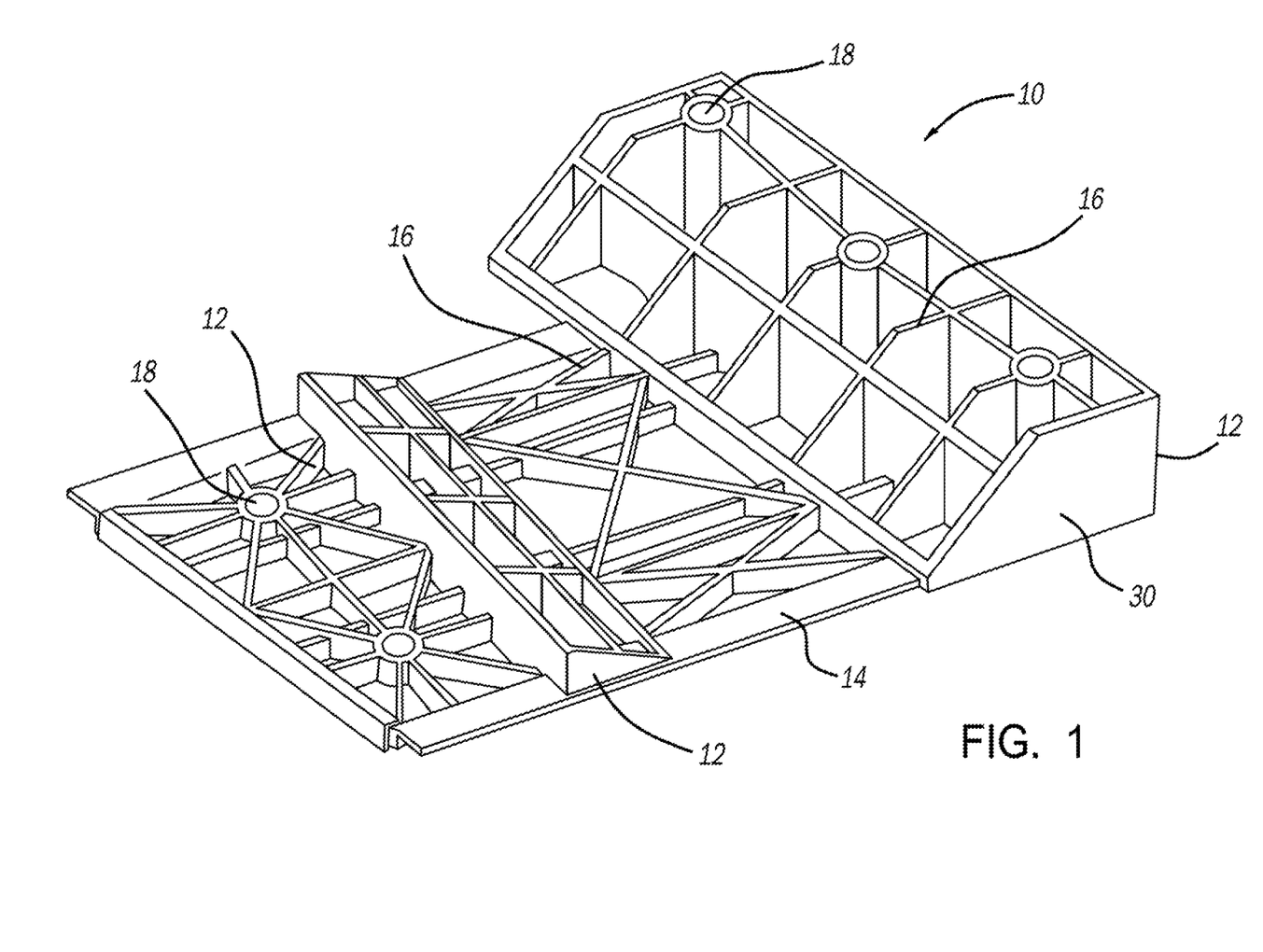
FIG. 1 is a perspective view of a structural member in accordance with the present teachings.
Figure 2:
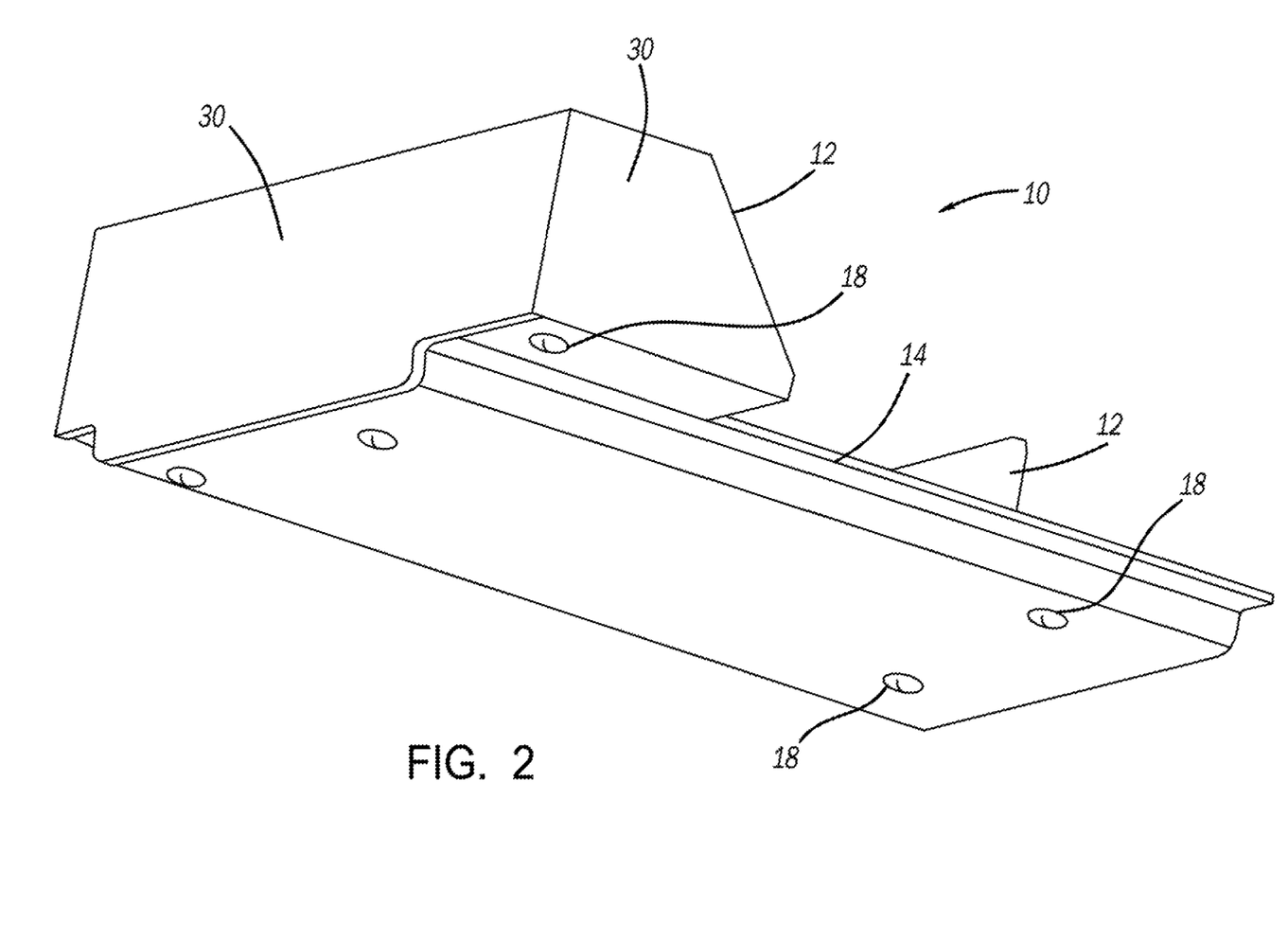
FIG. 2 is an additional perspective view of the structural member of FIG. 1.

Turning now to the figures, FIGS. 1 and 2 illustrate perspective views of a structural member 10. The structural member 10 includes a carrier 12 having one or more walls 30. The structural member 10 includes a secondary member 14. The carrier 12 includes a plurality of interconnected ribs 16. The carrier 12 and the secondary member 14 include one or more through holes 18.

Figure 3:
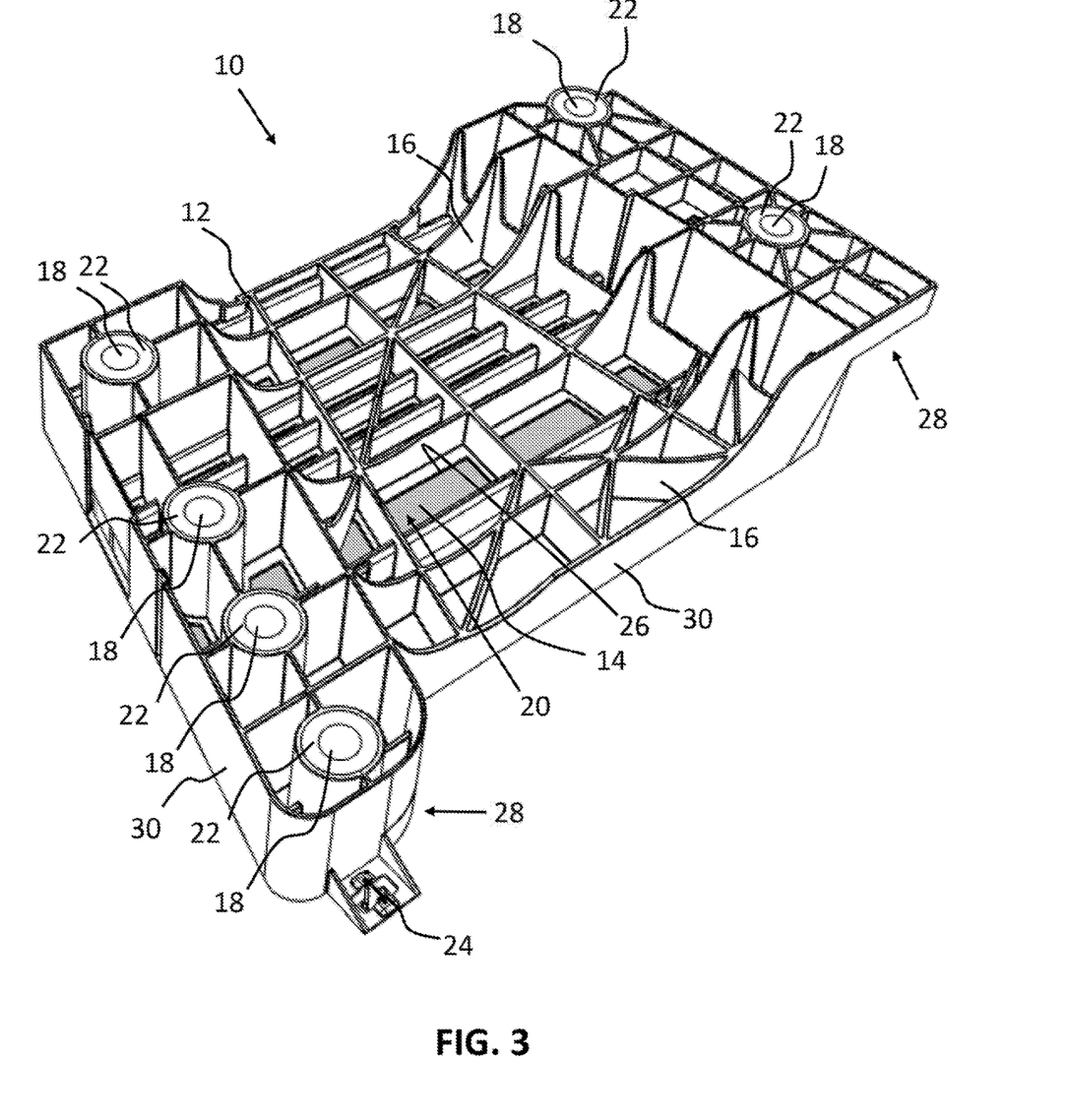
FIG. 3 is a perspective view of a structural member.
Figure 4:
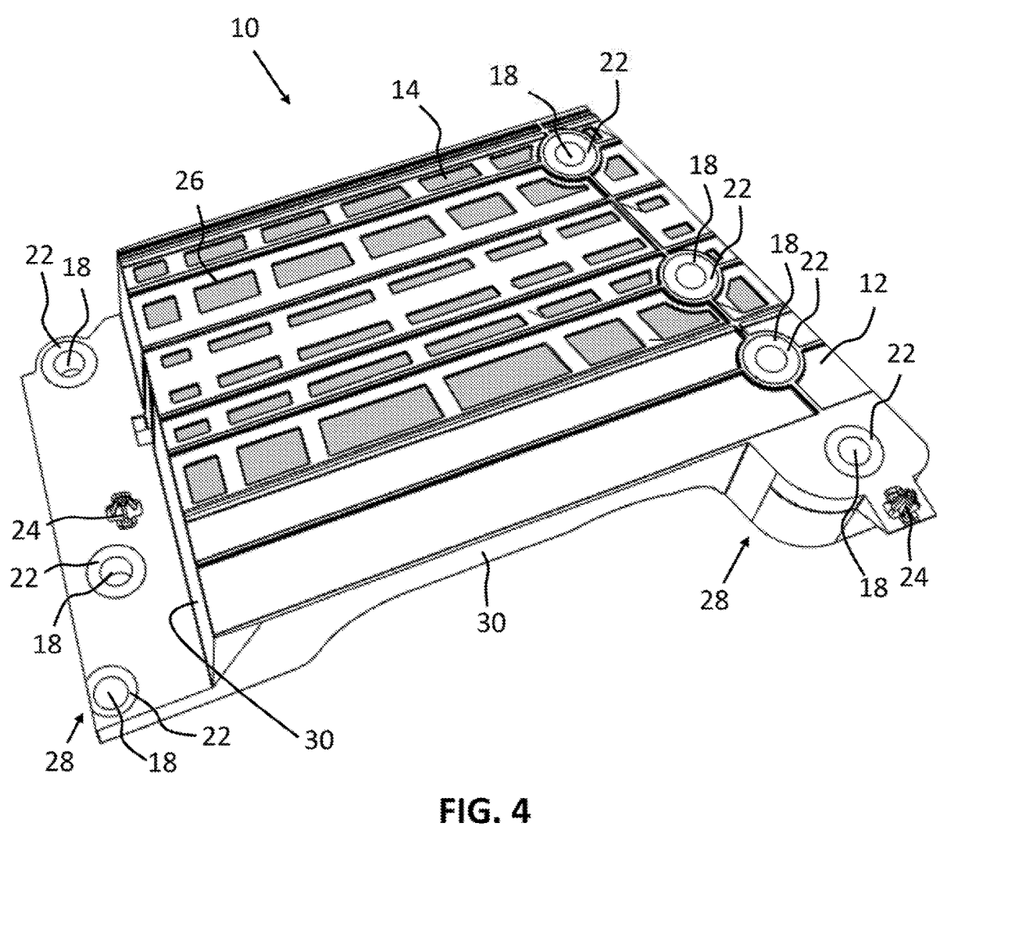
FIG. 4 is an additional perspective view of the structural member of FIG. 3.
Figure 5:
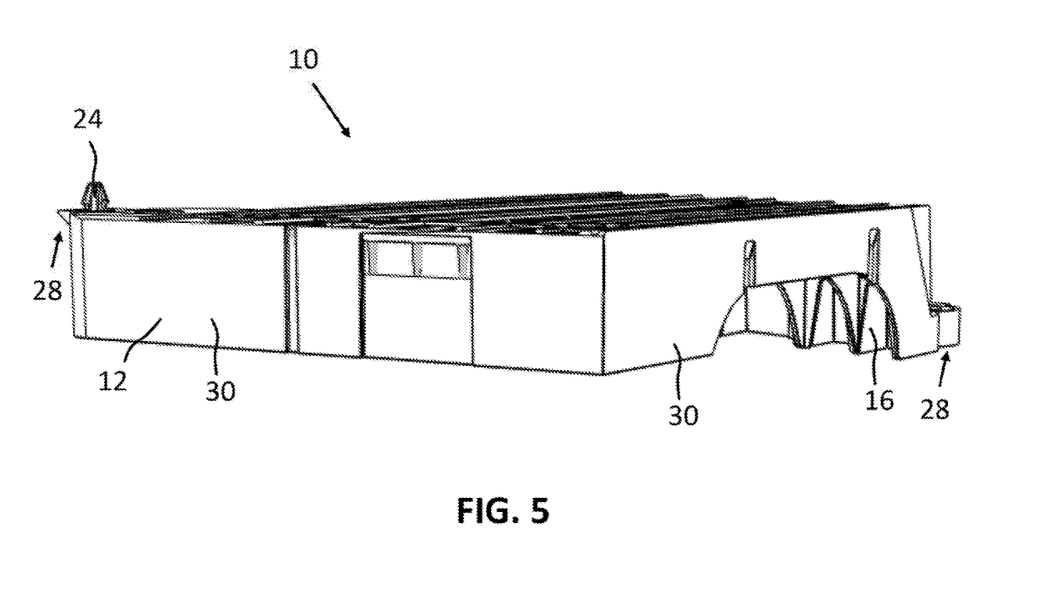
FIG. 5 is a perspective side view of the structural member of FIG. 3.

FIGS. 3-5 illustrate perspective views of a structural member 10. The structural member 10 includes a carrier 12. The carrier 12 is overmolded around a secondary member 14 so that the secondary member 14 is at least partially enclosed by the carrier 12. The carrier 12 includes a plurality of interconnected ribs 16 that support the secondary member 14 and increase structural integrity of the carrier 12. The ribs 16 are positioned within a plurality of walls 30 of the carrier 12. The walls 30, the ribs 16, or both form a plurality of cavities 20 having a cutout 26 that exposes the secondary member 14. The carrier 12 further includes a plurality of projections 28 extending from the carrier 12. The projections 28, the carrier 12, or both include a plurality of through holes 18 extending through the carrier 12 that are configured to receive one or more secondary fasteners, such as a bolt (not shown). Each through hole 18 is reinforced with a reinforcement member 22 positioned within a channel of the through hole 18. A plurality of fasteners 24, shown as push-pin type clips, are located along the carrier 12. It should be noted that while push-pin type clips are illustrated, any fastener may be located along the structural member 10.

Figure 6:
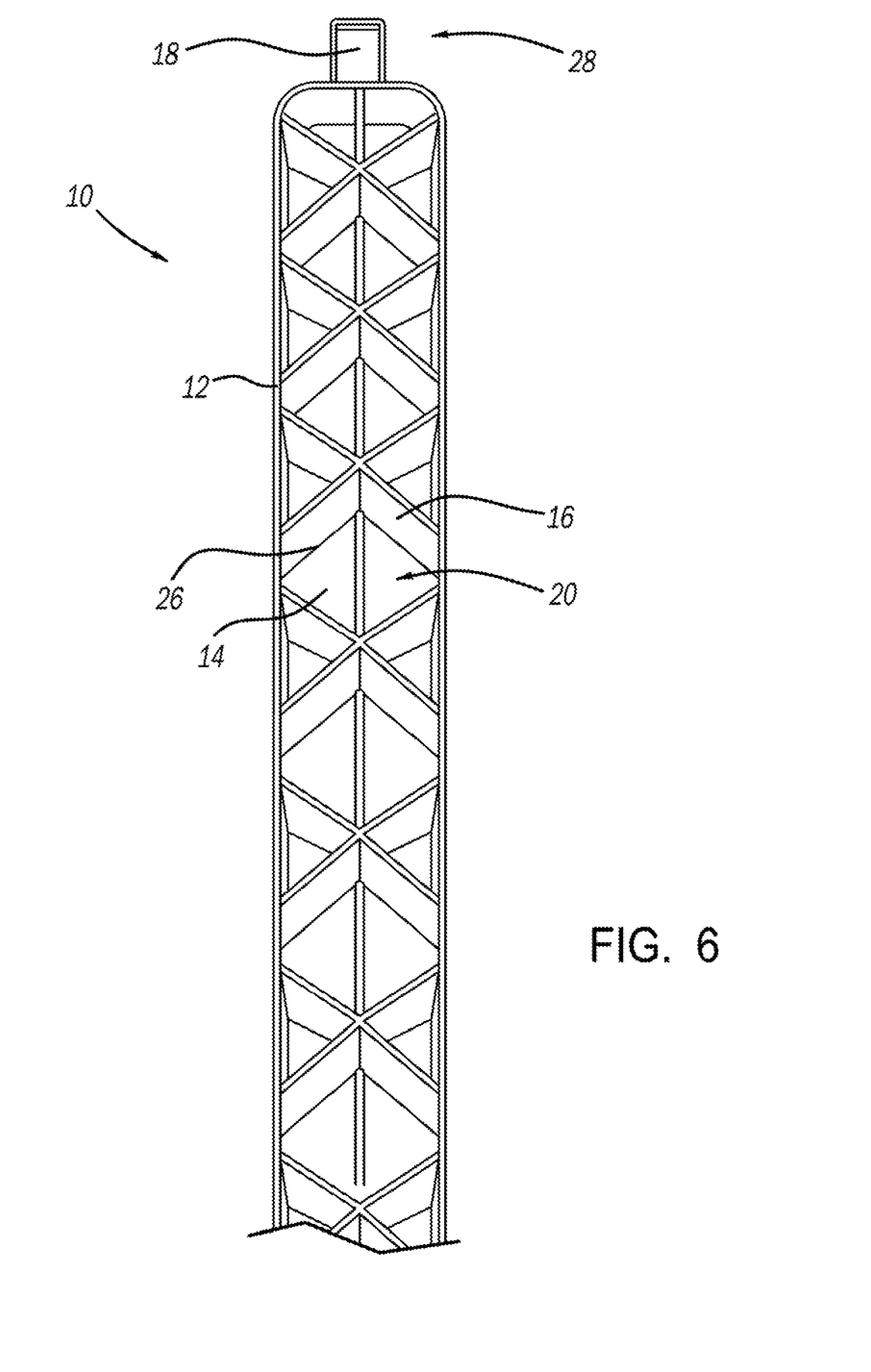
FIG. 6 is a top view of a structural member.
Figure 7:
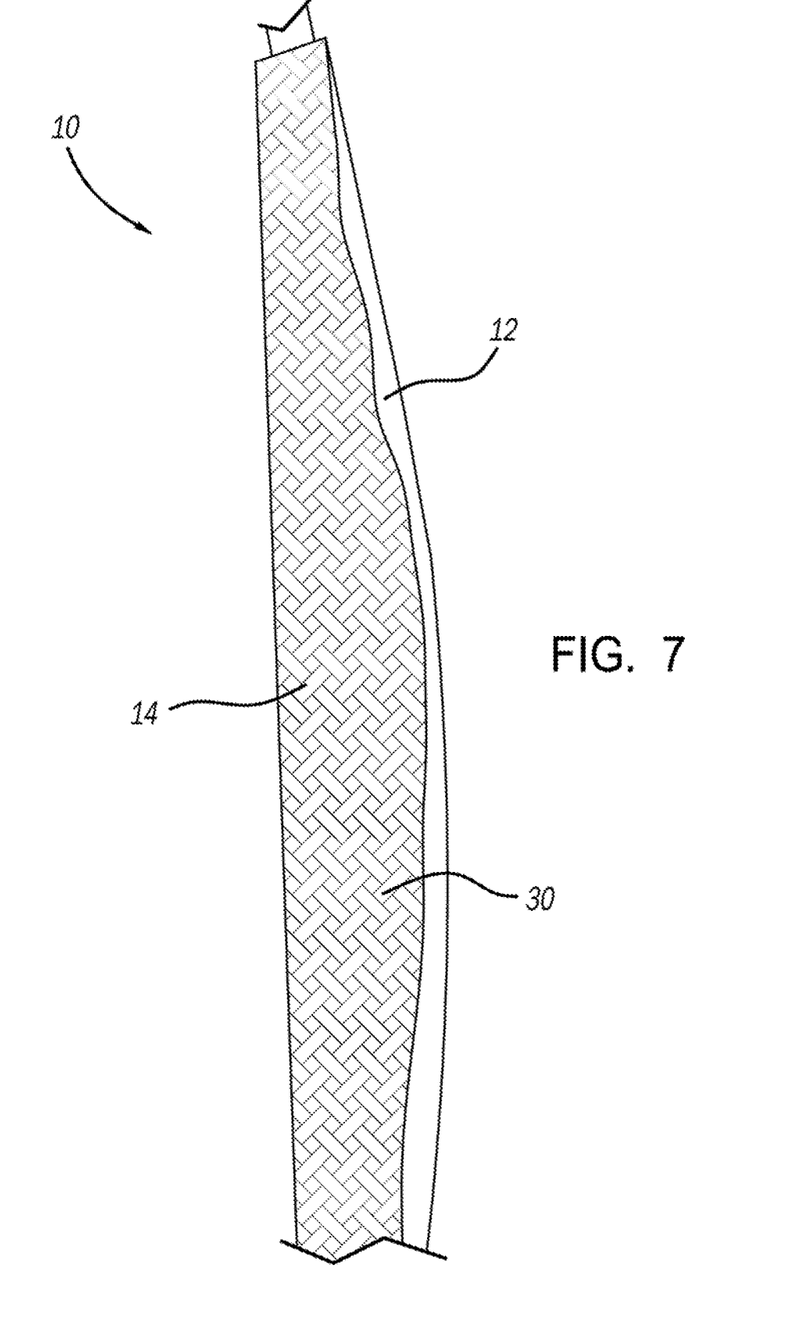
FIG. 7 is a side view of the structural member of FIG. 6.

FIGS. 6 and 7 illustrate a top view and a side view, respectively, of a structural member 10. The structural member 10 includes a carrier 12. The carrier 12 is connected to a secondary member 14 so that the carrier 12 is at least partially enclosed by the secondary member 14. The carrier 12 includes a plurality of interconnected ribs 16 that support the secondary member 14 and increase structural integrity of the carrier 12. The ribs 16 are positioned within a plurality of walls 30 of the carrier formed by the secondary member 14. The walls 30, the ribs 16, or both form a plurality of cavities 20 having a cutout 26 that exposes the secondary member 14 within an interior portion of the carrier 12. The carrier 12 further includes a projection 28 extending from the carrier 12. The projection includes one or more through holes 18 extending through the carrier that are configured to receive one or more secondary fasteners, such as a bolt (see FIG. 9).

Figure 8:
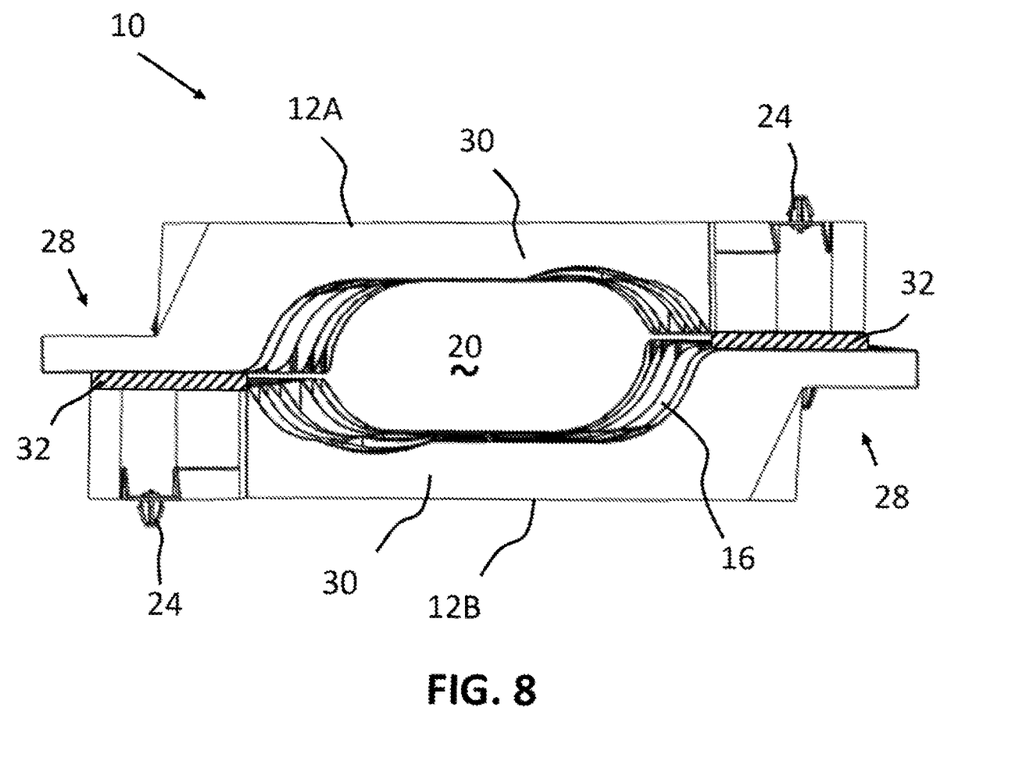
FIG. 8 is a side view of a structural member having a plurality of carrier.

FIG. 8 illustrates a side view of a structural member 10. The structural member includes a plurality of carriers 12 that form a substantially clamshell-shaped cavity 20. As illustrated, one or more projections 28, one or more walls 30, or both of a first carrier 12A abut one or more projections 28, one or more walls 30, or both of a second carrier 12B. An adhesive 32 may be positioned along mating portions of the carriers 12 where the first carrier 12A and the second carrier 12B abut each other. During an assembly process, the carriers 12 may abut one another and be temporarily secured by one or more temporary fasteners (see FIG. 10) until the adhesive 32 is fully cured. Alternatively, the carriers 12 may be initially joined by the adhesive 32 free of any temporary fasteners. It should be noted, however, that that structural member 10 may be free of an adhesive 32 that joins the carriers 12. Additionally, each carrier 12 includes a fastener 24 to secure the carrier 12 to one or more additional structures (not shown).

Figure 9:
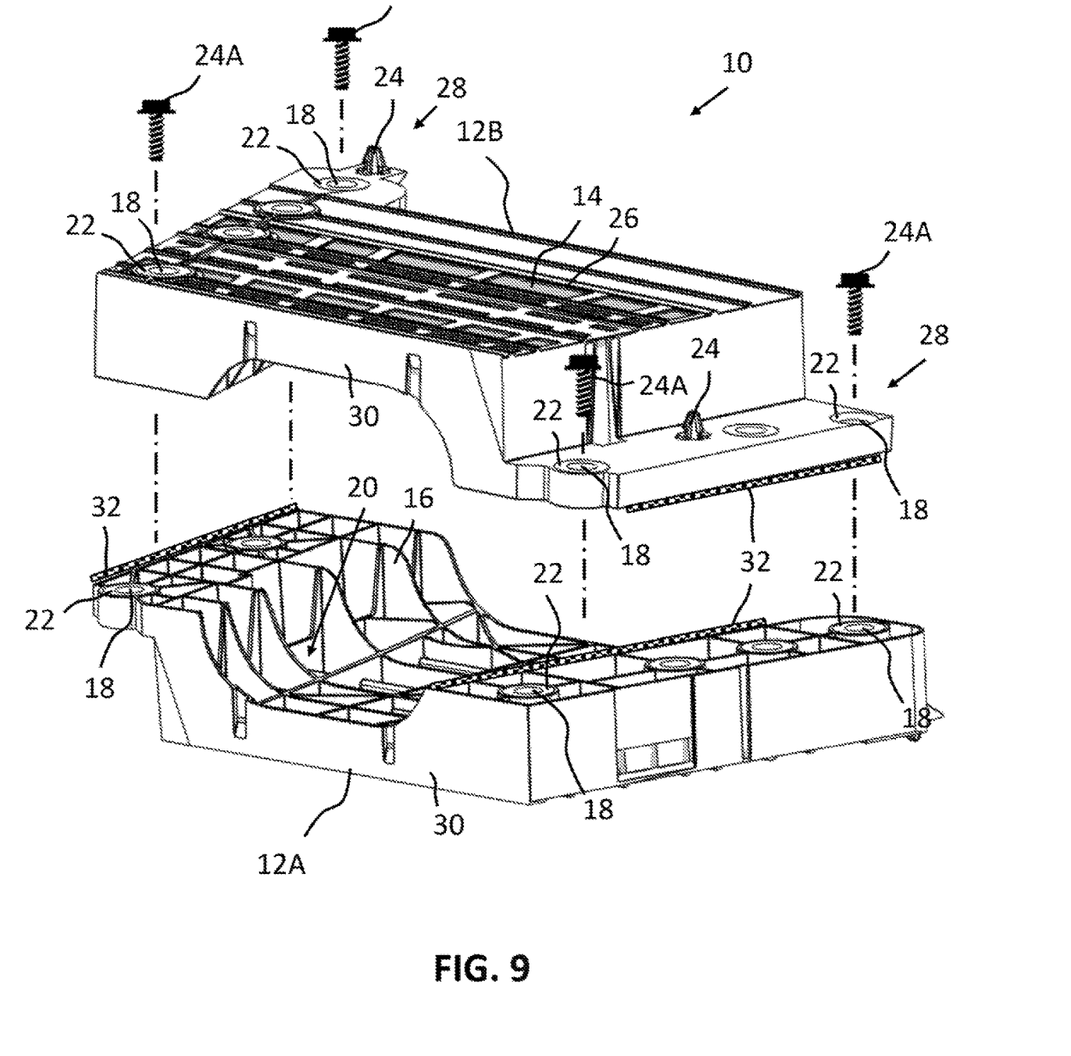
FIG. 9 is an exploded perspective view of the structural member of FIG. 8.

FIG. 9 illustrates an exploded perspective view of the structural member 10 of FIG. 9. The structural member includes a plurality of carriers 12 that form a substantially clamshell-shaped cavity (see FIG. 9). The carriers 12 are overmolded around a secondary member 14 so that the secondary member 14 is at least partially enclosed by the carrier 12. The carrier 12 includes a plurality of interconnected ribs 16 that support the secondary member 14 and increase structural integrity of the carrier 12. The ribs 16 are positioned within a plurality of walls 30 of the carrier 12. The walls 30, the ribs 16, or both form a plurality of cavities 20 having a cutout 26 that exposes the secondary member 14. The carriers 12 further include a plurality of projections 28 extending from the carrier 12. The projections 28, the carriers 12, or both include a plurality of through holes 18 extending through the carriers 12. As illustrated, one or more projections 28, one or more walls 30, or both of a first carrier 12A abut one or more projections 28, one or more walls 30, or both of a second carrier 12B. An adhesive 32 may be positioned along mating portions of the carriers 12 where the first carrier 12A and the second carrier 12B abut each other. During an assembly process, the carriers 12 may abut one another and be temporarily secured by one or more temporary fasteners 24A extending through the through holes 18 of the carriers 12 until the adhesive 32 is fully cured. The through holes 18 are reinforced with a reinforcement member 22 positioned within a channel of the through hole 18. Additionally, each carrier 12 includes a fastener 24 to secure the carrier 12 to one or more additional structures (not shown).

It should be noted that the structural member may be formed by a combination of molding steps and pultrusion steps. The molded polymeric member may be formed by an injection molding step. The pultruded member may be pultruded followed by the molded polymeric member being overmolded onto the pultruded member. Any adhesive material may be applied to the structural member by a second molding process (e.g., a two-shot molding process) whereby the adhesive material is injection molded onto the structural member.

REFERENCE LIST

10 Structural Member
12 Carrier
12A First Carrier
12B Second Carrier
14 Secondary Member
16 Rib
18 Through Hole
20 Cavity
22 Reinforcement Member
24 Fastener
24A Temporary Fastener
26 Cutout
28 Projection
30 Wall
32 Adhesive Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/− 15.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A structural member comprising:
    i) a first carrier and a second carrier, the first carrier and the second carrier each including:
        a) a plurality of interconnecting ribs
        b) one or more projections extending from exterior walls of each carrier;
        c) one or more secondary members encapsulated within and secured to one or more surfaces of the first carrier and the second carrier;
        d) one or more cutouts formed in the one or more surfaces which expose the one or more secondary members;
    ii) an adhesive material disposed on the first carrier, the second carrier, or both,
    wherein the first carrier and the second carrier are bonded to each other via the adhesive material; and
    wherein the first carrier and the second carrier are bonded to form a cavity.

2. The structural member according to claim 1, wherein the adhesive material is cured at room temperature to bond the first carrier and the second carrier.

3. The structural member according to claim 2, wherein the first carrier and the second carrier are different materials than the one or more secondary members.

4. The structural member according to claim 3, wherein the first carrier and the second carrier are a polyamide material, and the one or more secondary members are a carbon fiber reinforced thermoplastic.

5. The structural member according to claim 1, wherein the adhesive material is disposed on the one or more projections; and wherein the one or more projections of the first carrier and the second carrier abut one another to form a bond.

6. The structural member according to claim 1, wherein one or more mechanical fasteners temporarily connect the first carrier and the second carrier together during a curing time of the adhesive material.

7. The structural member according to claim 6, wherein one or more through holes of the first carrier and one or more through holes of the second carrier are aligned so that the mechanical fasteners extend through the one or more through holes of the first carrier and the one or more through holes of the second carrier which are aligned, and after curing of the adhesive material to bond the first carrier and the second carrier, the one or more through holes of the first carrier and the one or more through holes of the second carrier are configured to mount the structural member to one or more structures of a vehicle.

8. The structural member according to claim 1, wherein after bonding, the first carrier and the second carrier form a clamshell shape and the one or more secondary members are positioned within the clamshell shape.

9. The structural member according to claim 1, wherein the first carrier and the second carrier are overmolded around one or more surfaces of the one or more secondary members.

10. The structural member according to claim 8, wherein the curing time of the adhesive material is unaffected by heating the adhesive material to a temperature of 204° C. or less.

11. The structural member according to claim 8, wherein the plurality of interconnecting ribs form one or more cavities within the first carrier, the second carrier, or both.

12. The structural member according to claim 7, wherein the one or more through holes of the first carrier and the one or more through holes of the second carrier include a reinforcement member.

13. The structural member according to claim 1, further comprising one or more monolithically formed fasteners projecting from the one or more projections.

14. The structural member according to claim 13, wherein the one or more monolithically formed fasteners are a push pin type fastener.

15. The structural member according to claim 1, wherein the one or more secondary members extend along one or more outer walls of the first carrier, the second carrier, or both.

16. The structural member according to claim 1, wherein the first carrier and the second carrier are extruded nylon material or pultruded nylon material and the one or more secondary members are a molded carbon fiber reinforced thermoplastic.

17. The structural member according to claim 16, wherein the molded carbon fiber reinforced thermoplastic includes an epoxy resin, and the epoxy resin bonds to the extruded nylon material so that the first carrier and the second carrier are bonded to the one or more secondary members.

18. The structural member according to claim 1, wherein the adhesive material is disposed on both the first carrier and the second carrier, and the adhesive material disposed on the first carrier is free of contact with the adhesive material disposed on the second carrier when the first carrier and the second carrier are bonded to each other.

* * * * *